(No Model.)

B. H. MESSLER.
FLOWER STAND.

No. 253,877. Patented Feb. 21, 1882.

Witnesses:
H. W. Wells.
J. M. Moore

Inventor,
Basil H. Messler,
per Artemas B. Upham,
Attorney in Fact.

N. PETERS, Photo-Lithographer, Washington, D. C.

UNITED STATES PATENT OFFICE.

BASIL H. MESSLER, OF CANTON, ILLINOIS.

FLOWER-STAND.

SPECIFICATION forming part of Letters Patent No. 253,877, dated February 21, 1882.

Application filed May 9, 1881. (No model.)

*To all whom it may concern:*

Be it known that I, BASIL H. MESSLER, of Canton, in the county of Fulton, in the State of Illinois, have invented an Improved Flower-Stand; and I do hereby declare that the following is a full, clear, and exact description thereof, reference being had to the annexed drawings, making a part of this specification, in which like letters of reference refer to like parts, and in which—

Figure 1:
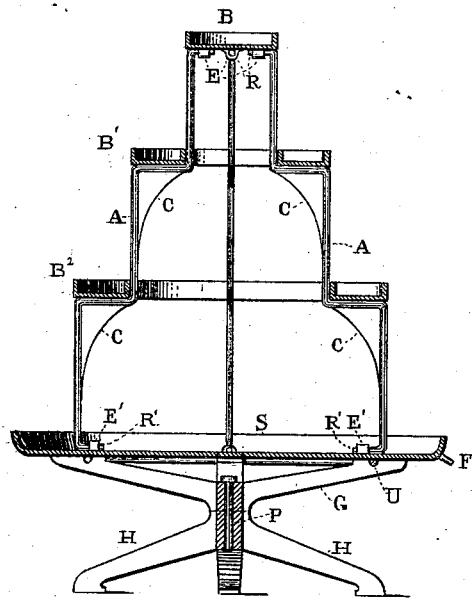
Figure 2:
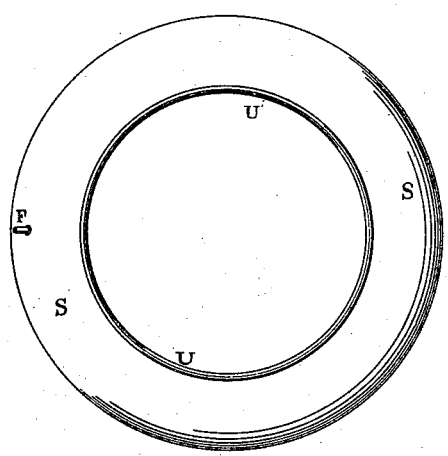

Figure 1 represents a vertical section; Fig. 2, view of under side of pan S.

The object of this invention is the construction of a flower-stand which shall be capable of being easily taken apart and packed into the smallest possible compass for transportation or storage, and the shelves of which shall be able to hold water, to dispense with saucers for the pots.

B, B', and B² are the shelves, made with raised rims and of such respective sizes that B shall be capable of being put into the hollow space at the center of B', and B' into B². The lowest shelf, S, is made in the form of a shallow pan, and is supported upon the standard G. Said standard G rests and rotates upon the legs H, being held thereon by the pin P. Said shelf or pan S is kept in place upon said standard G by the circular rod U, which is fastened to the under side of the pan S, resting in notches made in the upper sides of the extremities of said standard G. The shelves B B' B² are supported above the said pan S by the braces A, made in the shape shown in Fig. 1, strengthened by the V-shaped pieces C, fastened to them below the shelf-supporting bends. These braces A are held to the pan S by having their bent ends R' inserted into the eyes E', riveted to said pan. The upper ends, R, of said braces are bent also and inserted into eyes E, riveted to the under side of the shelf B. To draw off the water from said pan S a stop-cock, F, is provided.

To put this flower-stand together, supposing it to be entirely apart, the legs H are first placed upon the floor, the standard G put in place upon them, and the pin P inserted. The pan S having then been placed upon said standard G, with the circular rod U in its notches, the ends R' of the braces A are inserted into the eyes E', and the upper ends, R, of said braces A into the eyes E of the shelf B. The ring-shaped shelves B' and B² are now put down over said shelf B into their proper places upon the horizontal bends of the braces A, and our flower-stand is complete. The shelves B' and B² hold the ends of the braces A from coming out of the eyes E and E'. In taking apart, the exact reverse operation is gone through with.

When packed up the shelf B² rests upon the pan S, B' within B², B within B', and the braces A, standard G, and legs H laid upon them.

By having the lowest shelf an entire pan the plants resting upon the shelves can all be sprinkled without danger of wetting the floor.

What I claim as my invention, and for which I desire Letters Patent, is as follows, to wit:

1. The shelf B, having eyes E, ring-shaped shelves B' and B², and braces A, having bent ends R and R', in combination with the eyes E', the pan S, having stop-cock F and circular rod U, the standard G, having notched arms, the legs H, and pin P, substantially as and for the purpose set forth.

2. The combination of the shelf B, having eyes E, ring-shaped shelf B', braces A, strengthened by the V-shaped pieces C and having bent ends R and R', and the pan S, having eyes E', substantially as and for the purpose specified.

3. The combination of the pan S, having cock F, the circular rod U, fastened to the under side of said pan S, the standard G, legs H, and pin P, substantially as and for the purpose specified.

4. The pan S and circular rod U, fastened to the under side of said pan, in combination with the standard G, having notches at the upper ends of its arms, substantially as and for the purpose set forth.

In testimony that I claim the foregoing invention I have hereunto set my hand this 4th day of May, 1881.

BASIL H. MESSLER.

Witnesses:
J. M. MOORE,
H. W. WELLS.